United States Patent
Iijima

(10) Patent No.: US 7,212,232 B2
(45) Date of Patent: May 1, 2007

(54) REPRODUCTION APPARATUS AND COMPUTER PROGRAM FOR CONTROLLING REPRODUCTION APPARATUS

(75) Inventor: Ryunosuke Iijima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 10/635,761

(22) Filed: Aug. 6, 2003

(65) Prior Publication Data

US 2004/0027464 A1 Feb. 12, 2004

(30) Foreign Application Priority Data

Aug. 9, 2002 (JP) ............... 2002-233125

(51) Int. Cl.
*H04N 5/225* (2006.01)
*H04N 5/262* (2006.01)
*H04N 5/222* (2006.01)

(52) U.S. Cl. ................ 348/220.1; 348/240.2; 348/333.11

(58) Field of Classification Search .......... 348/240.2, 348/220.1, 240.99, 333.11, 333.12; 382/295, 382/298
See application file for complete search history.

(56) References Cited

U.S. PATENT DOCUMENTS

| | | | | |
|---|---|---|---|---|
| 5,519,452 A | * | 5/1996 | Parulski | 348/620 |
| 6,473,120 B2 | * | 10/2002 | Hirasawa et al. | 348/208.1 |
| 2002/0057346 A1 | * | 5/2002 | Hirasawa et al. | 348/208 |

* cited by examiner

*Primary Examiner*—Ngoc-Yen Vu
*Assistant Examiner*—Nicholas G Giles
(74) *Attorney, Agent, or Firm*—Cowan, Liebowitz & Latman, P.C.

(57) ABSTRACT

A reproduction apparatus includes: an enlarging processing unit for enlarging a desired area of an image displayed on a screen; and a control unit for changing operation characteristics of the enlarging processing means in accordance with whether the image is a moving image or a still image. The reproduction enlarging range can be quickly shifted during moving image reproduction, and can be finely shifted during moving image reproduction stop.

11 Claims, 2 Drawing Sheets

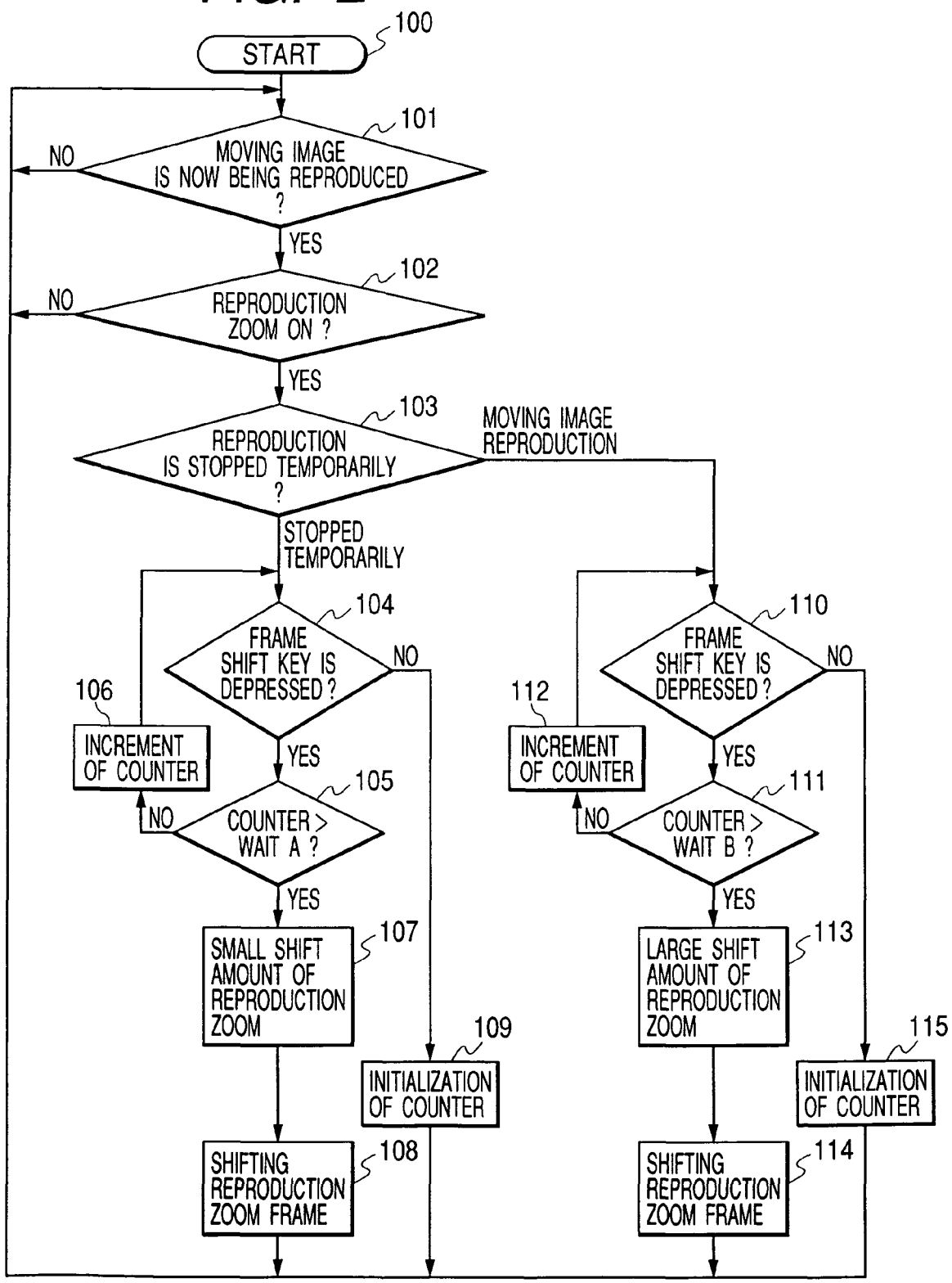

REPRODUCTION APPARATUS AND COMPUTER PROGRAM FOR CONTROLLING REPRODUCTION APPARATUS

BACKGROUND OF THE INVENTION

1. Field of the Invention

The present invention relates to an image processing apparatus having a reproduction zoom function and to a reproduction apparatus.

2. Related Background Art

Some recent digital video camera systems mount a reproduction enlarging system for enlarging an image through image processing. A desired area of a reproduced image can be enlarged (enlarging a reproduced image is hereinafter called a reproduction zoom).

When a reproduction zoom is to be performed, a reproduction zoom ON/OFF key is turned on and a zoom point and range to be subjected to the reproduction zoom of a reproduced image are selected by moving a zoom control key suitable for moving a pointer, such as a cursor key and a cross key.

This conventional method is, however, associated with the following problem when a desired area of a reproduced image is subjected to the reproduction zoom. If a reproduced image is a moving image, an object to be enlarged moves often in the reproduced image (e.g., if a moving child is photographed). In this case, a wait time, i.e., a follow-up performance in response to a depression of the zoom control key, is preferably given serious consideration in order to shift the reproduction zoom range by responding to the depression without delay. In this case, it is desired that the reproduction zoom range starts shifting at the same time when the reproduction zoom control key is depressed and that the reproduction zoom range shift amount per unit time is large.

If in order to track an object moving frequently in the reproducing image, the reproduction zoom range is arranged so as to start shifting at the same time when the reproduction zoom control key is depressed and the reproduction zoom range shift amount per unit time is set large, the following problem occurs. When the reproducing image temporarily stops and it becomes a still image, it is difficult to display an enlarged image of a desired object in a central area of a monitor screen, because even if the key is slightly depressed, the reproduction zoom range shifts quickly by an unexpected shift amount.

Conversely, if the wait time and the reproduction zoom range shift amount per unit time is set small in order to shift a desired subject to the central area of the monitor screen, the following problem occurs. When the reproduced image temporarily stopped is switched to a moving image, a desired object intended to be subjected to the reproduction zoom is hard to follow up.

SUMMARY OF THE INVENTION

It is an object of the invention to solve the above problems and provide an image processing apparatus capable of optimizing the reproduction zoom process of an image irrespective of whether the image is a moving image or a still image.

In order to achieve the above object, an aspect of the invention discloses a reproduction apparatus comprising: enlarging processing means for enlarging a desired area of an image displayed on a screen; and control means for changing operation characteristics of the enlarging processing means in accordance with whether the image is a moving image or a still image.

It is another object of the invention to provide a reproduction apparatus capable of controlling and optimizing the operation characteristics of a reproduction zoom process in accordance with a reproduction state, and a computer program for the reproduction apparatus.

Other features and advantages of the present invention will become apparent from the following description taken in conjunction with the accompanying drawings.

BRIEF DESCRIPTION OF THE DRAWINGS

FIG. 2 is a flow chart illustrating the operation of a system controller of the invention.

DESCRIPTION OF THE PREFERRED EMBODIMENTS

Figure 1:
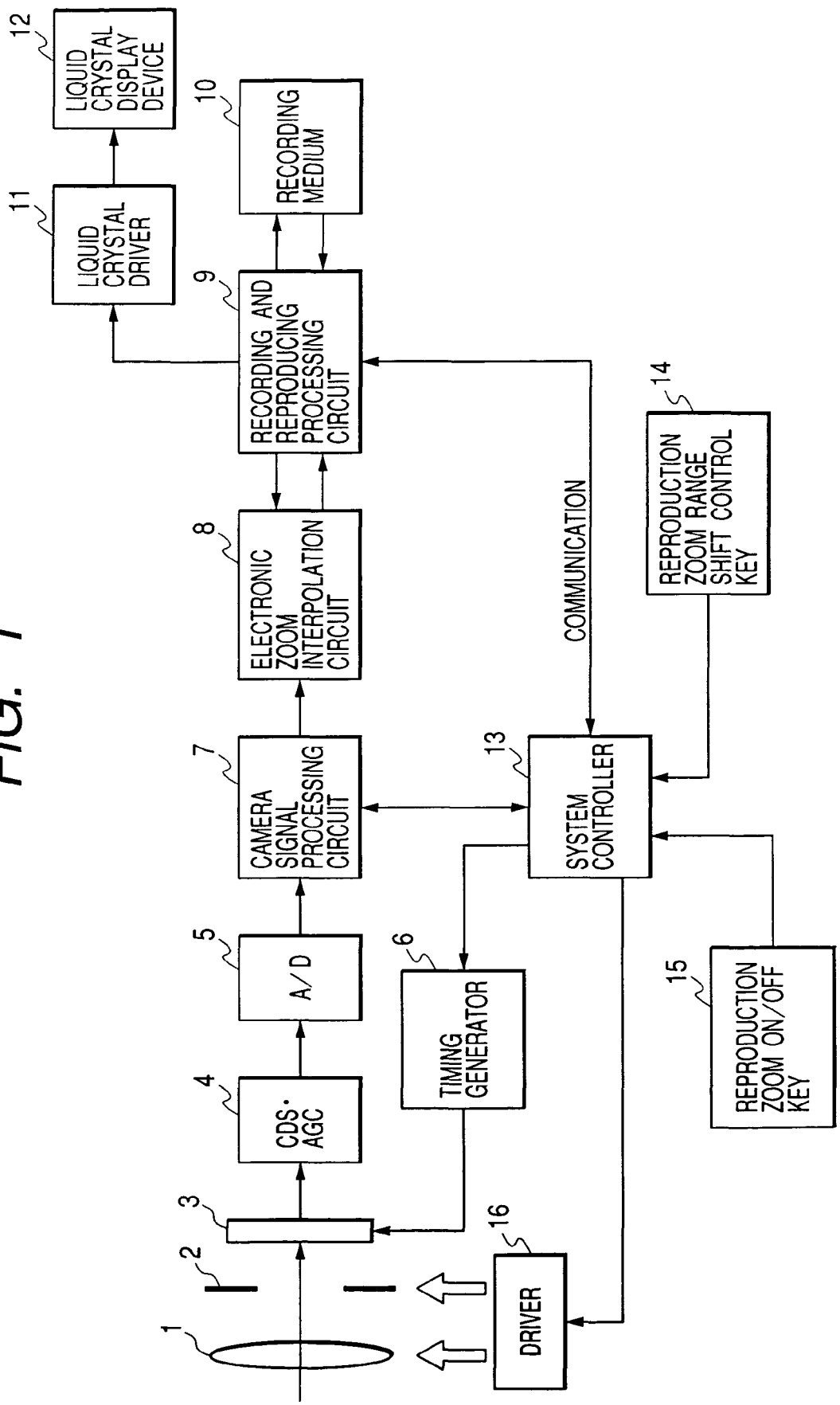
FIG. 1 is a block diagram showing the configuration of the invention.

A reproduction apparatus according to an embodiment of the invention will be described in detail.

FIG. 1 is a block diagram showing an application example of an image processing apparatus and a reproduction apparatus of the invention to a digital camera capable of recording a moving image and capable of a reproduction zoom of a moving image.

Referring to FIG. 1, reference numeral 1 denotes a lens to be used for focusing and zooming. The lens 1 is moved along the optical axis direction by a system controller 13 made of a microcomputer via a driver 16 to thereby perform focus adjustment and change an optical variable magnification factor.

Light passed through the lens 1 is adjusted by an iris 2 so as to have a proper light amount. The iris 2 is also controlled by the system controller 13 via the driver 16.

Light passed through the iris 2 is focussed on an image pickup plane of a CCD 3 functioning as an image pickup device, and photoelectrically converted into an electric signal. This photoelectrically converted signal is read out from CCD 3 in response to a reference clock generated by a timing generator TG 6. The read-out signal is sampled/held by a CDS/AGC 4 and at the same time controlled to have an optimum gain. This signal is then converted into a digital signal synchronized with the reference clock by an A/D converter 5.

A camera signal processing circuit 7 generates evaluation signals for auto focus (AF), white balance (AWB) and automatic exposure (AE). In accordance with each evaluation signal, the system controller 13 makes the driver 16 adjust the image to have a proper image state.

The digitalized image is supplied via an electronic zoom interpolation circuit 8 to a recording and reproducing processing circuit 9 to be recorded in a recording medium 10 in the form of a digital signal. At the same time, the digital signal is displayed on a liquid crystal display device 12 functioning as a monitor via a liquid crystal driver 11.

The electronic zoom interpolation circuit 8 electronically enlarges (reduces) image signals through an interpolation process (or thinning-out process), and corresponds to zoom processing means of the invention. This electronic zoom interpolation circuit is arranged so as to operate during both recording and reproducing.

When the reproduction zoom of a reproduced image is to be performed, an image read out from the recording medium 10 and reproduced by the recording and reproducing processing circuit 9 is once returned to the camera signal processing circuit 7, and then a reproduced image is subjected to the reproduction zoom process by the electronic zoom interpolation circuit 8. An image enlarged at a desired magnification factor is displayed on the liquid crystal display device 12 via the liquid crystal driver 11.

Whether or not the reproduction zoom is performed is designated by a reproduction zoom ON/OFF key 15. When the reproduction zoom range of a reproduced image is to be shifted, a reproduction zoom range shift control key 14 (corresponding to zoom range shifting means of the invention) is used. The reproduction zoom range shift control key 14 is preferably a cross key having up/down and right/left keys in order to shift a zoom point in a reproduced image.

Next, the operation of the invention will be described with reference to the flow chart shown in FIG. 2. The processes shown in FIG. 2 are executed by the system controller 13 corresponding to control means of the invention. The processes shown in the flow chart of FIG. 2 are stored in the form of a computer program.

When an electric power is supplied to the system controller 13, the processes start at Step 100. It is judged at Step 101 whether a moving image is now being reproduced. If a moving image is not being reproduced, the flow returns to Step 101 to repeat the judgement whether a moving image is being reproduced. If it is judged at Step 101 that a moving image is now being reproduced, the flow advances to Step 102 whereat it is judged whether the reproduction zoom is ON or OFF.

If it is judged at Step 102 that the reproduction zoom is OFF, the flow returns to Step 101 to repeat the processes described above. If the reproduction zoom is ON, the flow advances to Step 103 whereat it is judged whether a moving image is being reproduced or a moving image reproduction is stopped temporarily. If it is judged at Step 103 that a moving image is being reproduced, then the flow advances to Step 110 whereat the reproduction zoom process is performed during moving image reproduction.

Steps 110 to 115 show the reproduction zoom process performed during moving image reproduction. At Step 110 it is judged whether the reproduction zoom range shift control key 14 is depressed. If the reproduction zoom range shift control key 14 is not depressed, the flow advances to Step 115 to initialize a counter for measuring a depression time duration of the reproduction zoom range shift control key 14 to thereafter return to Step 101.

If it is judged at Step 110 that the reproduction zoom range shift control key 14 is depressed, the flow advances to Step 111 whereat the depression time duration of the control key is measured and judged. At Step 111 if the count of the counter is not equal to or larger than a value of a predetermined wait time B (a wait time corresponding to the count of the measuring counter), i.e., if it is not count>wait time B, then the flow advances to Step 112 whereat the measuring counter is incremented to thereafter return to Step 110.

If the count of the measuring counter takes a value of the wait time B or larger, the flow advances to Step 113 whereat a reproduction zoom range shift amount is set large. Then, the flow advances to Step 114 whereat the reproduction zoom range is shifted with the large range shift amount set at the step 113, to thereafter return to Step 101.

With the above processes, during the moving image reproduction, when the reproduction zoom range shift control key 14 is depressed to shift the reproduction zoom range, the reproduction zoom range starts shifting after the wait time B, i.e., when the count of the counter for measuring the depression time duration of the reproduction zoom range shift control key 14 becomes the value of the wait time B or larger. This delay time corresponding to the wait time B may be "0" when the follow-up of a moving image has a priority. However, the wait time B has some delay time in order to retain stability without excessively responding to vibrations due to the key operation and noises and to provide a response capable of following up a moving image to the sufficiently comfortable degree.

If it is judged at Step 103 that the moving image reproduction is stopped temporarily, the flow advances to Step 104 whereat the reproduction zoom process is performed while the moving image reproduction is stopped temporarily. At Step 104 it is judged whether the reproduction zoom range shift control key 14 is depressed. If the reproduction zoom range shift control key 14 is not depressed, the flow advances to Sep 109 whereat the control key depression time measuring timer is initialized to thereafter return to Step 101.

If it is judged at Step 104 that the control key 14 is depressed, the flow advances to Step 105 whereat the depression time duration of the control key is measured and judged. If it is judged at Step 105 that the count of the measuring counter is not the value of a predetermined wait time A or larger, the flow advances to Step 106 whereat the measuring counter is incremented to thereafter return to Step 104.

If the count of the measuring counter takes the value of the wait time A or larger, the flow advances to Step 107 whereat a reproduction zoom range shift amount is set small. Then, the flow advances to Step 108 whereat the reproduction zoom range is shifted with the small range shift amount set in the Step 107, to thereafter return to Step 101. The relationship between the delayed wait time B in the moving image reproduction state and the delayed wait time A in the moving image reproduction temporary step state is set to be the wait time B>the wait time A.

With the above processes, during temporary stop of the moving image reproduction, when the reproduction zoom range shift control key 14 is depressed to shift the reproduction zoom range, the reproduction zoom range starts shifting after the predetermined wait time A after the reproduction zoom range shift control key 14 is depressed, and also the unit shift amount is set small. Therefore, the reproduction zoom range of a still image can be correctly and reliably shifted at a small step.

More specifically, in the moving image reproduction state, when the control key for shifting the reproduction zoom range is depressed, the reproduction zoom range can follow up a moving image with a high response and without delay. In the temporary stop state of the moving image reproduction, when the control key for shifting the reproduction zoom range is depressed, the reproduction zoom range can be shifted correctly at a small step after elapse of the wait time.

The system controller 13 repeats the above processes until the electric power is turned off. The large reproduction zoom shift amount per unit time at Step 113 is set larger than the small reproduction zoom shift amount per unit time at Step 107.

As described above, in the reproduction zoom control during the moving image reproduction, the time duration, from the depression of the reproduction zoom range shift control key to the start of the reproduction zoom range shift, is set short and the reproduction zoom range shift amount per unit time is set large so that a desired object in a reproduced moving image can be followed up. In the reproduction zoom control during temporary stop of the moving image reproduction, the time duration, from the depression of the reproduction zoom range shift control key to the start of the reproduction zoom range shift, is set long and the reproduction zoom range shift amount per unit time is set small so that the reproduction zoom range can be shifted finely.

As described so far, the reproduction zoom range can be shifted quickly during the moving image reproduction and can be shifted much finely during temporary stop of the moving image reproduction. The operability of the apparatus can be improved considerably.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproduction apparatus comprising:
    enlarging processing means for enlarging a desired area of an image displayed on a screen; and
    control means for changing operation characteristics of said enlarging processing means in accordance with whether the image is a moving image or a still image,
    wherein said enlarging processing means includes enlarging range shifting means for shifting a range of an image to be subjected to an enlargement process, and wherein said control means changes a time duration from a start of an operation of shifting the range of the image to be enlarged by said enlarging range shifting means to an actual start of an enlarging range shift, in accordance with whether the screen is in a moving image display state or a still image display state.

2. A reproduction apparatus according to claim 1, wherein said enlarging range shifting means changes a position, range and magnification of the image to be enlarged.

3. A reproduction apparatus according to claim 1, wherein said control means sets short the time duration from the start of the operation of shifting the range of the image to be enlarged by said enlarging range shifting means to the actual start of the enlarging range shift, in the moving image display state, and sets long the time duration from the start of the operation of shifting the range of the image to be enlarged by said enlarging range shifting means to the actual start of an enlarging range shift, in the still image display state.

4. A reproduction apparatus comprising:
    reproducing means capable of reproducing a moving image;
    enlarging means for enlarging an image reproduced by said reproducing means;
    enlarging range shifting means for setting a range of an image to be enlarged by said enlarging means; and
    control means for changing operation characteristics of said enlarging range shifting means in accordance with whether said reproducing means is in a moving image reproduction state or a moving image reproduction temporary stop state.

5. A reproduction apparatus according to claim 4, wherein said control means changes a time duration from a start of an operation of shifting a range of an image to be enlarged by said enlarging range shifting means to an actual start of an enlarging range shift, in accordance with whether said reproducing means is in the moving image reproduction state or the moving image reproduction temporary stop state.

6. A reproduction apparatus according to claim 4, wherein said enlarging range shifting means changes a position, range and magnification of the image to be enlarged.

7. A reproduction apparatus according to claim 4, wherein said control means sets short a time duration from a start of an operation of shifting a range of an image to be enlarged by said enlarging range shifting means to an actual start of an enlarging range shift, in case that said reproducing means is in the moving image reproduction state, and sets long the time duration from a start of an operation of shifting a range of an image to be enlarged by said enlarging range shifting means to an actual start of an enlarging range shift, in case that said reproducing means is in the moving image reproduction temporary stop state.

8. A computer-executable program stored on a computer-readable storage medium comprising a program code causing a computer to control a reproduction apparatus to perform a method for reproducing a moving image and a still image, the method comprising the steps of:
    reproducing an image by reproducing means;
    enlarging an image reproduced by said reproducing means;
    setting an enlarging range of the image by enlarging range shifting means for shifting a range of an image to be enlarged by enlarging means; and
    changing operation characteristics of said enlarging range shifting means in accordance with whether said reproducing means is in a moving image reproduction state or a moving image reproduction temporary stop state.

9. A control program for a reproduction apparatus according to claim 8, wherein said process of changing the operation characteristics of said enlarging range shifting means changes a time duration from a start of an operation of shifting a range of an image to be enlarged by said enlarging range shifting means to an actual start of an enlarging range shift, in accordance with whether said reproducing means is in the moving image reproduction state or the moving image reproduction temporary stop state.

10. A control program for a reproduction apparatus according to claim 8, wherein said enlarging range shifting means changes a position, range and magnification of the image to be enlarged.

11. A control program for a reproduction apparatus according to claim 9, wherein said process of changing the operation characteristics of said enlarging range shifting means sets short a time duration from a start of an operation of shifting a range of an image to be enlarged by said enlarging range shifting means to an actual start of an enlarging range shift, in case that said reproducing means is in the moving image reproduction state, and sets long the time duration from a start of an operation of shifting a range of an image to be enlarged by said enlarging range shifting means to an actual start of an enlarging range shift, in case that said reproducing means is in the moving image reproduction temporary stop state.

* * * * *